Patented Jan. 13, 1948

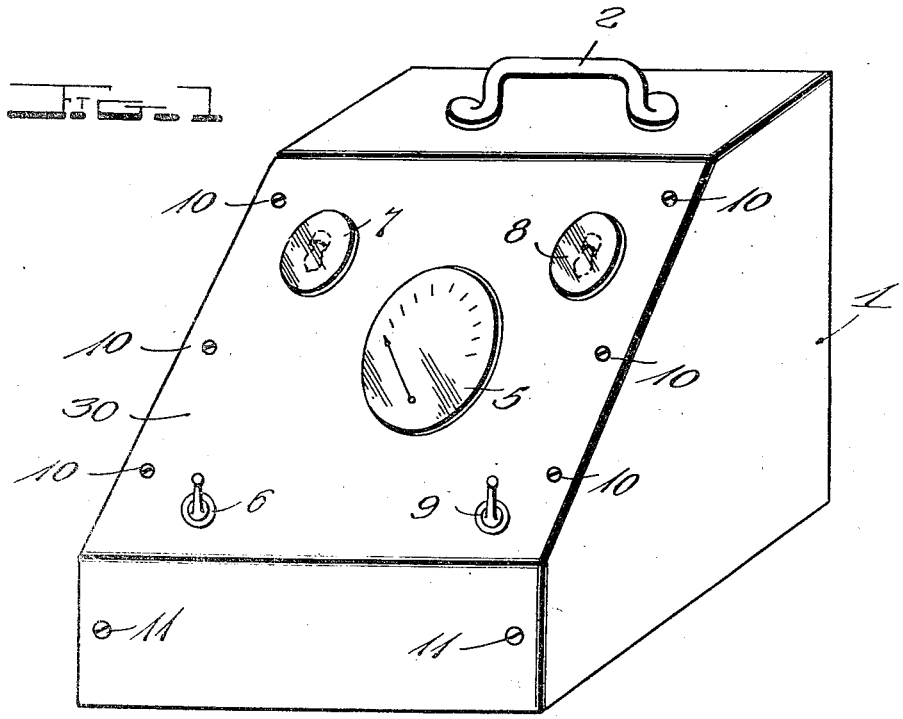
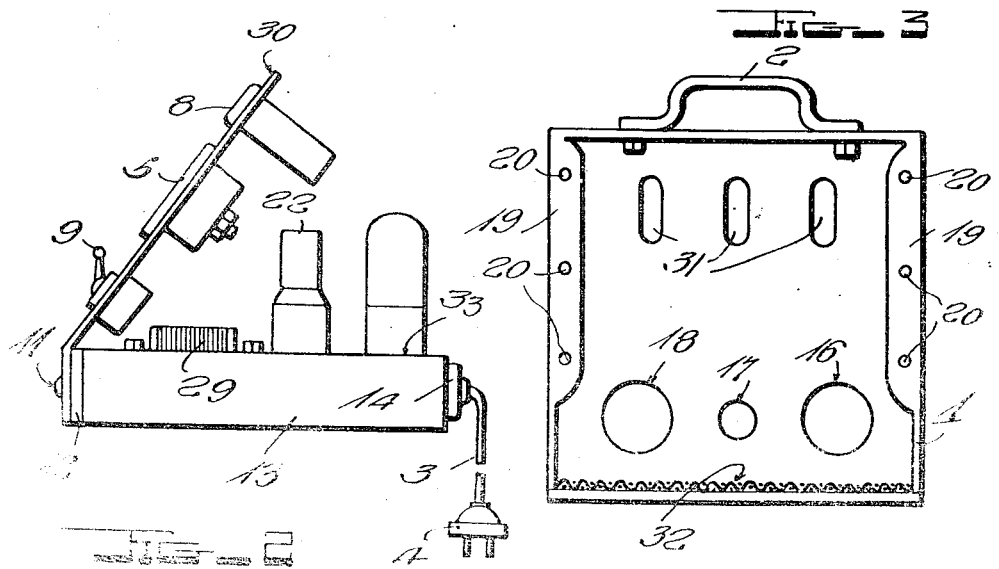

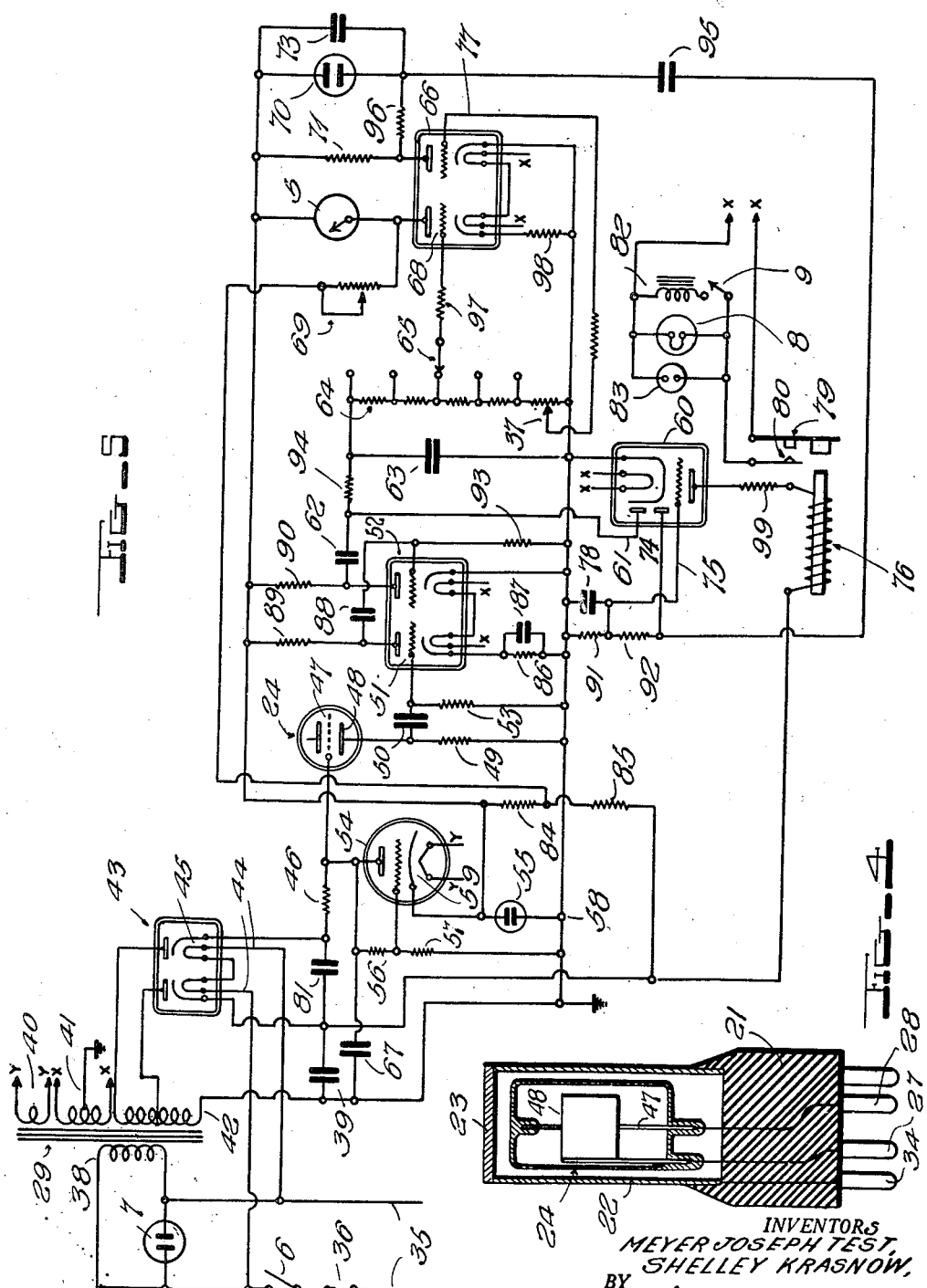

2,434,297

UNITED STATES PATENT OFFICE 2,434,297

RADIATION INTENSITY METER

Meyer Joseph Test, Kansas City, Mo., and Shelley Krasnow, New York, N. Y.

Application October 1, 1941, Serial No. 413,241

12 Claims. (Cl. 250—83.6)

This invention relates to a light compact portable aparatus for indicating gamma ray intensity. It is an object of the invention to supply such an apparatus which will at all times indicate the intensity of gamma rays on a dial, which will be completely portable, and simple in operation.

It is a further object of the invention to provide an apparatus which will sound a signal or light a signal lamp whenever the intensity in the vicinity exceeds a safe value.

It is a further object of the invention to provide such an apparatus with a definite operating characteristic so that it will sound an alarm for the same value of gamma ray intensity at all times.

It is a further object of the invention to provide an apparatus which will have several ranges of operation.

It is a further object of the invention to provide a mounting for a Geiger-Muller counter tube so as to provide for easy interchanging of the said tube.

It is a further object of the invention to provide a simplified form of mechanical construction for an apparatus using a Geiger-Muller counter tube.

It is a further object of the invention to provide an apparatus with a suitable accurate integrating circuit so that the number of pulses indicated may be recorded upon a dial and read conveniently.

It is a further object of the invention to provide an apparatus and system upon which an alarm will be sounded at a distant point whenever the gamma ray intensity in the vicinity exceeds a safe value.

The harmful effects of gamma rays produced by radium and similar radioactive substances, and of X-rays having properties analogous to gamma rays, have long been recognized. Workers handling such preparations or working in the vicinity of X-ray machines are often subjected to dangerous conditions. This is all the more serious in view of the fact that gamma rays and X-rays produce no sensation and may give rise to considerable bodily damage before any sensation whatever is felt. It is further well recognized that a number of rather small doses, received constantly or continuously by a worker working in the vicinity of unshielded radium can give rise to serious difficulties. Recent investigations have in fact shown that serious genetic changes may be caused by very small repeated doses, much smaller than those considered in the prior art to be of any serious nature. These facts make it important to have an apparatus which will indicate dangerous conditions.

The prior art apparatus, while capable of detecting such conditions, required the attendance of an observer and the deliberate making of measurements from time to time to determine whether dangerous conditions existed. The annoyance connected with such measurements discourages their use, particularly under the pressure of work.

The apparatus described in the present invention is intended to obviate these difficulties. This apparatus is so constructed that it operates continuously. It need only be connected to the standard power supply and left in the operating condition. Thus, whenever the gamma ray intensity in the vicinity exceeds a safe value, a definite alarm, both visual and audible will be given and users in the vicinity will be warned of the dangerous conditions which exist. This alarm will continue to operate until the dangerous conditions have been rectified. The apparatus will operate no matter what the direction of the incident rays and no matter whether the difficulty is caused by one concentrated source or by a number of small sources producing an additive effect.

Reference is had to the accompanying drawings in which:

Figure 1 represents a general perspective external view of the apparatus.

Figure 2 shows a side view of a portion of the apparatus when removed from its outer protective case.

Figure 3 shows a front view of the case, with the front panel removed.

Figure 4 shows a mounting for the Geiger-Muller counter tube.

Figure 5 shows the wiring diagram for the apparatus.

The entire apparatus is contained within a case 1, which may be of wood, plastic, or other suitable substance, but which is preferably made of metal. Steel has been found a suitable material. The front of the case 1 has a sloping face upon which are mounted the control and indicating elements. In the center is a meter 5 upon which the intensity is indicated at all times. To the left of this meter is a pilot lamp 7, to indicate whether or not the instrument is operating. At the right part of the panel is a warning light 8 which becomes illuminated when the intensity has exceeded a safe value. In the lower part of the panel is a switch 6, which controls the current input and a switch 9 which controls the alarm circuit. Screws 10 hold the front panel to the remainder of the case 1 and are removed whenever it is desired to remove the operating parts thereof. A handle 2 is affixed rigidly to the top of the case. The front part of the panel is fastened by means of screws 11 to a spacer block 12, which is in turn fastened to a frame or chassis 13. In the rear part of the chassis 13 is a removable plug 14 which is connected to the power cord 3, which in turn terminates in a standard attachment plug 4. The front part of panel 30 is thus fastened to the chassis 13 in such fashion that the entire assemblage may be removed as a unit without detaching any of the connections between the units mounted on panel 30 and chassis 13. The case 1 has in its front part two longitudinally extending flanges 19, in which are provided tapped holes 20. These flanges extend for only the sloping portion of the case 1. Screws 10 are threaded into holes 20 and thus serve to hold the entire removable assemblage in place. In the upper part of the case 1 are provided ventilating openings 31, also circular openings 16, 17, and 18. Opening 16 is so placed as to be in alignment with the opening in the rear part of the chassis 13 for receiving the power supply cord. Similarly opening 18 aligns with a receptacle in the chassis for receiving the cord to an external circuit. Opening 17 is coincident with the position of a control element on the rear part of the chassis 13. Thus, after the cords have been removed, there are no connections hindering the removal of the entire working assemblage. During the operation of the apparatus, heat is produced by the various elements and it is found desirable to dissipate this heat effectively. This is particularly desirable in view of the fact that the resistances used in different parts of the support have appreciable temperature coefficients. Thus, if sufficient ventilation is not provided, the resistances will change their values depending upon the external temperature, the radiating properties of the unit, and the length of time the apparatus has been operating. To obviate these effects, the bottom of the case 1 is provided with a series of openings. To prevent solid particles from entering these openings and causing disturbance in the electrical system, a piece of wire netting or screening 32 is fastened to the bottom of the inside of case 1. Chassis 13 is provided with a series of ventilating openings in the upper surface 33. Thus, in operating, a current of air will be drawn from the lower part of the apparatus due to convection, will circulate through the chassis 13, and escape through ventilating openings 31. In cases in which considerable dust exists, it may be necessary to mount a plate almost entirely covering netting 32, but raised an appreciable distance therefrom. By this, the air will be forced to follow a tortuous passage and relatively little dust will be carried thereby. In cases in which considerable radioactive dust exists in the vicinity, this latter precaution is necessary and it may in fact be necessary to seal the entire apparatus tightly. In this case, it will be allowed to attain thermal equilibrium by being left on for a suitably long time after which reliable measurements may be made.

The mounting of the Geiger-Muller tube used in the apparatus is one that has caused some difficulty in the prior art. Such tubes were usually held by clamping means and were provided with soldered connections. It thus required virtually the services of an instrument maker to replace a tube. It has been found that such a tube may be conveniently and effectively mounted in a standard vacuum tube base, and thus conveniently removed and replaced by relatively unskilled personnel. An effective means of doing this is shown in Figure 4. Here a vacuum tube base 21, preferably of a low loss plastic and of a four pronged variety, is turned to the shape shown and bored to receive a tube 22. The tube 22 may be of metal, in which case it is fastened to one of the prongs 34, and grounded within the apparatus to avoid capacity disturbances. The Geiger-Muller counter shown schematically as 24 is placed with its terminals projecting downwardly and these terminals are connected respectively to prongs 27 and 28. A metallic cover 23 is provided, upon which may be marked the serial number of the tube and its important characteristics. The tube 24 is preferably covered with some highly insulating wax such as "Superla" wax manufactured by the Standard Oil Company of Indiana. This wax will prevent leakage due to moisture adhering to the surface of the glass. The enclosure formed by tube 22, base 21, and top 23, serve another important function. They prevent the admission of dust to the Geiger-Muller tube. This is very important since in many cases the apparatus will be used in plants in which the dust will contain appreciable quantities of radioactive materials. This dust will adhere to the usual Geiger-Muller tube and cause it to develop a high "background" which will make measurement more difficult. The facility with which the Geiger-Muller tube may be changed allows spare tubes to be kept and allows the instrument to be checked readily by substituting a new tube and observing the behavior of the instrument. This procedure took a prohibitively long time with prior art structures.

Where it is desired to make the apparatus insensitive to beta rays, as may be necessary when measurements are made on strong radioactive sources, the outer protective covering 22, and the cover 23 may be made of lead 1 centimeter or more in thickness. In such cases, a lead disk could be placed at the bottom of the cavity in insulator 21, with openings for the lead wires. Such a shield will effectively exclude any beta rays which might not be stopped by the outer case 1, or the air between the source and the Geiger-Muller tube. A removable shield, fitting closely over the assemblage shown in Figure 4 and made of lead of approximately 1 centimeter thickness may also be utilized. It is understood that lead or other shielding or filtering material may be placed within the interior of case 1, and fastened to the walls thereof so as to serve the same function as the shield surrounding element 22. A similar construction may be utilized to make the apparatus directional i. e. to make the response chiefly to rays from a given source. In such cases, the shielding material could be excluded from one side of the case or one side of the tube 22, making the apparatus especially sensitive to rays from that direction.

Referring now to Figure 5, 29 represents a power transformer of a conventional type. A receptacle 35 is provided through which current enters through a fuse 36 and an on-off switch 6. This is directly across the primary 38 of transformer 29, and also has across it a small neon lamp 7, to indicate whether the power is on or off. Although an ordinary incandescent lamp may be utilized, a neon lamp is desirable because of the limited current drawn and the limited heat produced thereby. Filament windings 40 and 41 are provided. These are connected in conventional fashion to the vacuum tubes as shown. A high voltage winding 42 is connected to a rectifier 43. This may be a usual full wave rectifier type, but is not utilized in the conventional way. One half of this rectifier provides the voltage for the plates of the vacuum tube while the other side provides the voltage for the Geiger-Muller counter. The rectifier 43 is preferably a type which operates directly from the high voltage supply current, and has its filament terminals 44 connected across the supply line. Cathode 45 is connected through resistor 46 to the central wire 47 of Geiger-Muller counter 24. The outer cylinder 48 of the Geiger-Muller counter is connected through resistor 49 to ground. A blocking condenser 50 is connected between the outer cylinder 48 of the Geiger-Muller tube and the grid 51 of vacuum tube 52. A resistor 53 is connected between the grid 51 and ground. The Geiger-Muller counter is supplied with a constant high voltage through the regulator system shown. This consists of vacuum tube 54, and voltage regulator gas discharge tube 55, connected through resistors 56 and 57 as shown, to the terminal of the resistor 46. One terminal 58 of voltage regulator tube 55 is connected to ground while the other terminal is connected to cathode 59 of tube 54. A discharge of the Geiger-Muller counter 24 by the action of gamma rays, cosmic rays, or X-rays, produces a positive voltage pulse across tube 60. This pulse is amplified by tube 52, which acts as a resistance capacitance coupled amplifier. The tubes are operated at that portion of their characteristic, such that they are overloaded. Under these conditions, the output pulses will be of the same size regardless of the value of the input pulses. This also follows from the fact that the plate voltage has been stabilized by the voltage regulator 55. The amplified pulses are rectified by the diode portion 61 of tube 60, and the rectified pulses charge condenser 62. This further results in the charging of condenser 63 to a voltage whose magnitude is proportional to the frequency of repetition of pulses produced by the Geiger-Muller counter 24. The voltage across condenser 63 is fed directly across the "step ladder attenuator" 64, consisting of a number of resistances in series. The voltage from the switch 65 across attenuator 64 will be applied across one side of tube 66. One portion of tube 66 is connected to a milliammeter 5 as shown, and the output of this portion of tube 66 will thus be fed across the milliammeter 5 and will give a reading which is proportional to the voltage on the grid 68 of this section of the tube 66. Since this former voltage is proportional to the frequency of pulses produced by the tube 24, the reading on the milliammeter will therefore be proportional to the frequency of the pulses. It can be seen that the plate circuit of tube 52, including element 54, comprises a circuit operated by the radioactive sensitive member 24. A potentiometer 69, connected to the meter 67 as shown provides a zero setting for the meter. The circuit containing the potentiometer 69, together with its source of voltage at element 84, may be termed a bucking circuit.

This bucking circuit, it will be seen, applies a voltage counter to that applied to the milliammeter 5, and therefore opposes the voltage applied to the milliammeter. The source of voltage for the bucking circuit is obtained from the voltage divider composed of resistors 84 and 85, which derive their voltage from rectifier tube 43 through voltage regulator tube 55. By proportioning the resistors 84 and 85 properly, the desired voltage opposite to that applied to the meter 5 may be obtained. The exact magnitude of this may be adjusted by means of rheostat 69. Thus, it is seen, that a variable bucking voltage can be obtained, and can be used to set the meter to any desired value at any time.

By adjusting the position of switch 65, the range of the instrument may be changed. For instance, if the lowermost position shown is utilized, the instrument will be on its least sensitive range, since the voltage applied to grid 68 of vacuum tube 66 will only be a fraction of the total voltage across the condenser 63. In order to operate a relay, lamp, and buzzer so that the latter units will be actuated when the frequency of the pulses reaches a predetermined value, an auxiliary unstable circuit is utilized. This makes use of gas discharge tube 70, which is connected to one side of vacuum tube 66 as shown, through resistor 71. A condenser 73 is placed across the elements of the discharge tube 70. The discharge tube 70, being supplied with voltage as shown, will oscillate periodically by virtue of the resistance and capacity connected thereto, and the frequency of the oscillations will be dependent upon the relative values of capacity and resistance. This oscillation is rectified by one of the diode elements 74 of tube 60. The consequence of this is that the potential of the grid 75 of vacuum tube 60 is raised to a high negative value, making the current through the relay coil of relay 76 very small. When the grid voltage applied to grid 77 of tube 66 becomes more negative due to increase of voltage across condenser 63, the voltage drop across resistor 71 decreases until it is insufficient to supply the gas discharge lamp 70, at which time the oscillation in this circuit ceases. The voltage across condenser 78 therefore becomes zero or a very low value. When this occurs, sufficient current flows through tube 60 to energize the coil of relay 76. The relay will therefore close contacts 79 and 80, operating a low voltage lamp 8, a buzzer 82, and any external alarm connected across the alarm outlet 83. A switch 9 controls the buzzer and may be opened if desired. The lamp 8, buzzer 82, and any external device connected across the alarm outlet constitutes singly or in combination, means actuated by the sensitive member 24 and oscillatory circuit containing elements 70 and 73 jointly.

Use of the gas discharge lamp and its local associated circuit therefore provides definite operation, which will take place when a certain definite counting rate has been reached. With prior art devices, the current through the relay coil of a relay such as 76 would be provided directly from the plate of a vacuum tube. The operation of the relay would be indeterminate since a relay will not always pull in with exactly the same current nor will it always open for the same value of current drop. The effect of the auxiliary circuit with the gas discharge lamp is to provide a sort of "sharpening" circuit, one which will function accurately. Whenever the applied voltage, dependent upon the frequency of pulses, reaches the predetermined value, there will be a sudden rush of current through the relay coil. As soon as the value drops below the figure desired, there will be a sudden resumption of the action of the discharge lamp and therefore the sudden dropping out of the relay contacts. The control 37 serves to adjust the exact value for which the relay will operate. This is done, as shown, by adjusting the potential of the grid 77 of tube 66, relative to the cathode of the tube.

It is thus seen that an instrument has been provided which will receive the pulses from a Geiger-Muller counter and will indicate at all times on a meter the frequency of these pulses. The Geiger-Muller counter will be unaffected by fluctuations in line voltage as will the remainder of the circuit by virtue of the use of the voltage regulator system shown. The range of operation may be changed, and the meter be made to read zero for a condition of no received rays. An additional "sharpening" circuit has been provided so that the alarm elements will be operated very definitely to give an indication when the intensity has reached a predetermined value and will cease functioning when the intensity drops below that value.

It is obvious that a number of changes and additions may be provided without departing from the spirit of the invention. Thus, another voltage regulator system such as a number of gas discharge lamps in series may be provided across the voltage supply for the Geiger-Muller tube, in place of the specific regulator shown. The meter 67 may be a conventional recording type, made to record the values with passage of time and thus furnish a permanent record of the radioactivity. Such records may be obtained in the absence of an observer and will indicate whether dangerous conditions have existed at any time in the absence of the observer or whether material has been removed. Such a recording device may also be placed near a storage depository for radioactive material and will indicate the time at which any material has been removed.

It is further obvious that the relay on closing may actuate circuits other than a simple alarm circuit. Thus, the unit when used in conjunction with X-ray work can control the input X-ray tube current through the relay, and cause this current to become zero whenever the intensity exceeds a safe value. In this modification, the relay coil on being energized would open the contacts rather than close them. The relay may also operate a shielding member held in place by an electromagnetically operated latch. Thus, as soon as the value becomes too high for safety, the latch would be operated and the shield would drop in place.

The apparatus may be utilized in searching for lost radioactive material by turning the sensitivity control to its most sensitive position, and carrying the instrument about the place where the presence of radioactive material is suspected. The indication on the meter will increase as one approaches the material, thus giving an indication of its proximity. The apparatus may also be utilized for the relative measurement of quantity of radioactive material. For this purpose, a standard known sample of material can be placed at a definite position relative to the apparatus. The reading is taken, after which the unknown sample is substituted in exactly the same spot and the reading again taken. The readings will be in the ratio of the quantities. It is to be noted that the apparatus is linear, that the reading on the meter is exactly proportional to the frequency of pulses produced by the Geiger-Muller tube 24.

Where the hard gamma rays from radioactive material or the penetrating X-rays are of greatest interest, the case 1 may be made of steel and the case 22 surrounding the Geiger-Muller counter may be made of copper, approximately one millimeter thick. Where indications of less penetrating rays are desired, the case may be made of wood or plastic, and the surrounding tube 22 made of plastic. In the latter case, if shielding is found necessary due to the proximity of other circuit elements causing capacity disturbances, the tube 22 may be surrounded either with a grounded piece of screening or thin aluminum foil, either of which will have very little stopping power for the rays.

The apparatus will necessarily respond to cosmic rays and the values of intensity as indicated will be the sum of that due to cosmic rays plus gamma rays and X-rays in the vicinity. If it is desired to select an artificial zero as reference, one may, by adjusting the control 69, set the meter to read zero in the presence of the ordinary cosmic rays plus whatever gamma rays are produced by, say the walls of the room in which the instrument is utilized. The instrument will then respond only to increases above the usual gamma ray and cosmic ray background.

The apparatus may be made operative by direct current at such voltages as six volts, 32 volts, 110 volts, and 220 volts, by using a conventional vibrator type inverter to convert the direct current to alternating current. The inverter unit may be fastened rigidly to the under part of the case 1 and connections made to the inverter unit by plug 4. In this way, the apparatus will become a universal type in which either direct current or alternating current may be utilized.

Certain of the resistors and condensers have been designated as numbers 39, 67, and 84 to 100 inclusive. The functions of these have not been given in detail since their operation will be apparent from their relation to the remainder of the circuit elements.

A suitable set of values and characteristics for a unit as shown, is given below:

| | |
|---|---|
| 36—1 ampere fuse | 90—.075 meg. |
| 7—¼ watt neon lamp | 62—.00025 mfd. |
| 29—"Stancor" P2751 transformer | 93—2 meg. |
| | 94—5 meg. |
| 43—117 Z6GT | 63—1.0 mfd. |
| 39—8 mfd. 450 volt | 91—20 meg. |
| 67—.01 mfd. 1000 volt | 92—1 meg. |
| 81—½ mfd. 600 volt | 78—.02 mfd. |
| 46—0.1 meg. | 60—6SR7 |
| 54—6SF5 | 69—10,000 ohm |
| 56—20 meg. | 5—0 to 1 milliampere range |
| 57—4 meg. | |
| 55—VR-150 | 71—0.2 meg. to 0.5 meg. |
| 84—2000 ohm | 96—2 meg. |
| 85—50,000 ohm | 70—T-2 neon lamp |
| 49—2 meg. | 73—.0005 mfd. |
| 50—.000075 mfd. | 95—.001 mfd. |
| 53—2 meg. | 97—50 meg. |
| 52—7F7 | 66—7F7 |
| 86—5,000 ohm | 99—25,000 ohm |
| 87—20 mfd. | 98—500 ohm |
| 88—.000075 mfd. | 100—10 meg. |
| 89—0.3 meg. | |

A suitable function to be served by the oscillatory circuit utilizing gas discharge lamp 70 is to change the range of the instrument instead of actuating an alarm as shown.

One way in which this will be accomplished is as follows: The relay 76 instead of operating alarm elements could operate a switch placing an additional condenser in parallel with condenser 63. This would automatically change the range of the instrument. If desired, a signal such as a lamp 8 could be made to light by the same relay in conventional fashion, so that there will be an indication that a higher range is being utilized.

Several ranges may be provided in this fashion by having several oscillatory circuits, each ceasing to function at a definite voltage, and each separately operating a relay placing still another condenser in parallel with condenser 63. The one system shown, can serve this function if the relay is a "stepping" relay such as that manufactured by the American Automatic Electric Company, each step providing an additional condenser in parallel with condenser 63. It is, of course, understood that the relay could in the same fashion automatically alter the position of switch 65 to provide a different range.

The scope of the invention is indicated by the appended claims.

We claim:

1. In an apparatus for measuring radioactivity, a measuring element having a medium whose electrical properties are modified in relation to the radioactivity impinging thereon, whereby the said element will give at its output an electrical response related to radioactivity, electromagnetic means operable from the output of said element sensitive to radioactivity, an unstable circuit actuated by the output of the said radioactive sensitive member, and serving to actuate directly the electromagnetic device, the said unstable circuit providing a sharp point of operation for the actuation of the electromagnetic device, thereby making the actuation of the said electromagnetic device more certain and accurate.

2. In an apparatus for actuating a device upon the reaching of a predetermined value of radioactive intensity, a measuring element having a medium whose electrical properties are modified in relation to the radioactivity impinging thereon, whereby the said element will give at its output an electrical response related to radioactivity, an oscillatory circuit, and means to be actuated by the said measuring element and the circuit jointly, means to cause the cessation of the oscillation when the response from the sensitive member has reached a predetermined value, and means to cause a greatly altered current to flow in the said device when the oscillatory circuit has ceased to operate, thereby providing definite and accurate operation of the said device by the measuring element.

3. In an apparatus to provide a definite operation of an electrically response device, when the radioactive intensity has exceeded a definite value, a measuring element having a medium whose electrical properties are modified in relation to the radioactivity impinging thereon, whereby the said element will give at its output an electrical response related to radioactivity, a circuit operated by the radioactive measuring element, and serving to give an integrated output voltage whose value is proportional to the radioactive intensity, an auxiliary unstable circuit responsive to the said voltage, the said unstable circuit causing a current to flow in the device to be operated when the voltage impressed upon the said circuit has exceeded a definite predetermined value, thereby providing operation of the said device for a definite value of radioactive intensity.

4. In an apparatus for measuring radioactivity, a Geiger-Muller counter sensitive to radioactivity, amplifying means to amplify the output of said Geiger-Muller counter, a current indicating meter operable from the output of the said means, an adjustable bucking circuit connected to the said current meter and serving to apply a voltage opposed to that produced by the amplifying means, the said bucking circuit providing means for setting the meter to a predetermined value for a given value of radioactive intensity.

5. In an apparatus for measuring radioactivity, a Geiger-Muller counter sensitive to radioactivity and having an electrical output, electromagnetic means operable from the output of said Geiger-Muller counter, an unstable circuit actuated by the output of said Geiger-Muller counter, and serving to actuate directly the electromagnetic device, the said unstable circuit providing a sharp point of operation for the actuation of the electromagnetic device, thereby making the actuation of the said electromagnetic device more certain and accurate.

6. In an apparatus for actuating a device upon the reaching of a predetermined value of radioactive intensity, a Geiger-Muller counter sensitive to radioactivity and having an electrical output, an oscillatory circuit, and means to be actuated by the said Geiger-Muller counter and the circuit jointly, means to cause the cessation of the oscillation when the response from the Geiger-Muller counter has reached a predetermined value, and means to cause a greatly altered current to flow in the said device when the oscillatory circuit has ceased to operate, thereby providing definite and accurate operation of the said device by the Geiger-Muller counter.

7. In an apparatus to provide a definite operation of an electrically responsive device, when the radioactive intensity has exceeded a definite value, a Geiger-Muller counter sensitive to radioactivity and having an electrical output, a circuit operated by said Geiger-Muller counter, and serving to give an integrated output voltage whose value is proportional to the radioactive intensity, an auxiliary unstable circuit responsive to the said voltage, the said unstable circuit causing a current to flow in the device to be operated when the voltage impressed upon the said circuit has exceeded a definite predetermined value, thereby providing operation of the said device for a definite value of radioactive intensity.

8. An apparatus for the measurement of radioactivity comprising an element sensitive to radioactivity and providing a series of pulses indicative of the radioactive intensity, means to amplify the output of the said sensitive member, means to provide a voltage whose value is proportional to the integrated output of the amplifying means, an indicating meter to indicate the said voltage together with means in the form of a bucking circuit to set the meter to a predetermined reading for a given value of radioactivity, an auxiliary unstable circuit generating oscillations whose frequency is independent of the production of pulses by the sensitive member, the said voltage being impressed upon the said unstable circuit, so that the oscillations thereof will cease when the voltage has reached a predetermined value, means responsive to the cessation of oscillations in the said oscillatory circuit, and adapted to provide a signal whenever the said oscillations have ceased, all of the aforesaid elements being mounted upon a unitary relatively rigid member, and enclosed by a case through which the radioactive rays must pass to reach the sensitve member, the portions of the case through which the radiations must pass being of material having desired filtering properties for the radioactive rays.

9. In an apparatus for measuring radioactivity, electrical means to provide a voltage, radioactive-sensitive means having a medium whose electrical properties are modified in relation to the radioactivity impinging thereon, whereby the said element will give at its output an electrical response related to radioactivity to modify said voltage in accordance with the intensity of radioactivity affecting said radioactive sensitive means, an oscillatory circuit to generate oscillations of predetermined frequency, means interconnecting the voltage providing means and oscillatory circuit to cause the oscillations thereof to cease when the said voltage has reached a predetermined value, and means operable by the said oscillatory circuit when the oscillations have ceased.

10. A method of operating a signal whenever a radioactive intensity has exceeded a predetermined value, said method comprising generating a series of pulses, a characteristic thereof being related to the intensity of radioactivity, generating a voltage whose value is determined by the said characteristic of the generated pulses, generating oscillations independent of said pulses, causing the oscillations to cease whenever the voltage determined by the selected characteristics of the pulses has reach a predetermined value and operating a signal when the oscillations have ceased.

11. A method of operating a signal whenever a radioactive intensity has exceeded a predetermined value, said method comprising creating a voltage whose value is related to the intensity of radioactivity, generating oscillations independent of the creation of said voltage, causing the oscillations to cease whenever the voltage determined by the radioactivity has reached a predetermined value and operating a signal when the oscillations have ceased.

12. In an apparatus for measuring radioactivity, a measuring element having a medium whose electrical properties are modified in relation to the radioactivity impinging thereon, whereby the said element will give at its output an electrical response related to radioactivity, amplifying means to amplify the output of the said element, a current indicating meter operable from the output of the said means, an adjustable bucking circuit connected to the said current meter and serving to apply a voltage counter to that produced by the amplifying means, the said bucking circuit providing means for setting the meter to a predetermined value for a given value of radioactive intensity.

MEYER JOSEPH TEST.
SHELLEY KRASNOW.

REFERENCES CITED

The following references are of record in the file of this patent:

UNITED STATES PATENTS

| Number | Name | Date |
|---|---|---|
| 2,150,430 | Drenkard | Mar. 14, 1939 |
| 1,765,487 | Huffman | June 24, 1930 |
| 2,081,041 | Kott | May 18, 1937 |
| 2,081,074 | Strauss | May 18, 1937 |
| 2,264,725 | Shoupp | Dec. 2, 1941 |
| 2,265,631 | Coffin | Dec. 9, 1941 |
| 2,265,966 | Gebauer | Dec. 9, 1941 |
| 2,161,979 | Rovner | June 13, 1939 |
| 2,162,412 | Victoreen | June 13, 1939 |
| 2,037,924 | Rentschler | Apr. 21, 1936 |

FOREIGN PATENTS

| Number | Country | Date |
|---|---|---|
| 74,155 | Austria | Feb. 11, 1918 |